May 4, 1948. J. E. SCHLENKERT 2,440,978
ANGLE CUTTER
Filed Nov. 20, 1944 3 Sheets-Sheet 2
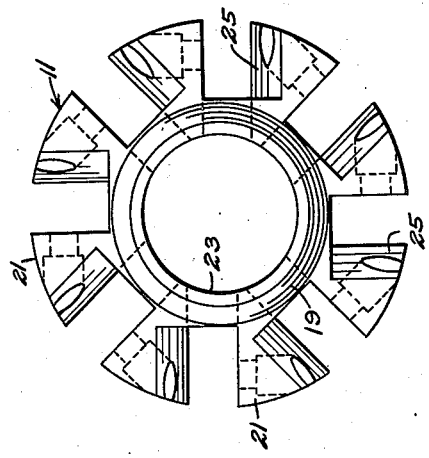
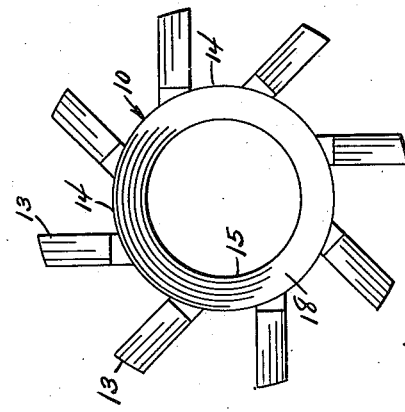
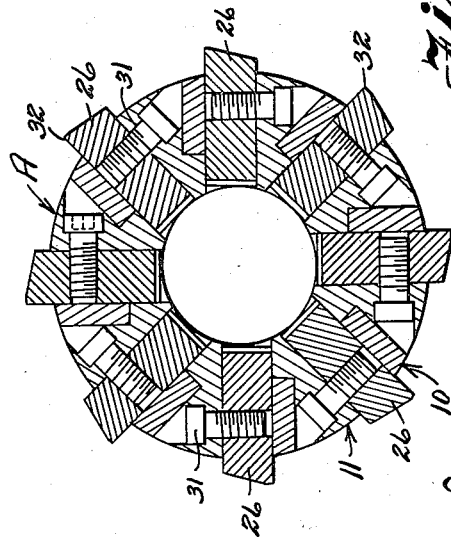
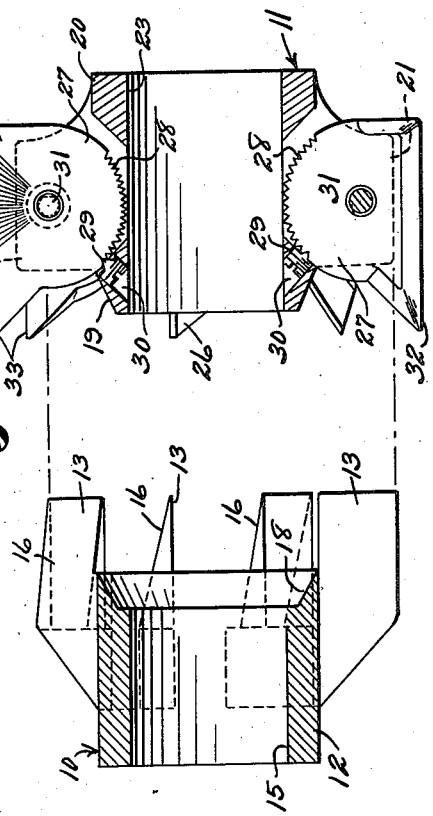
INVENTOR.
John E. Schlenkert
BY Victor J. Evans & Co.
ATTORNEYS May 4, 1948. J. E. SCHLENKERT 2,440,978
ANGLE CUTTER
Filed Nov. 20, 1944 3 Sheets-Sheet 3
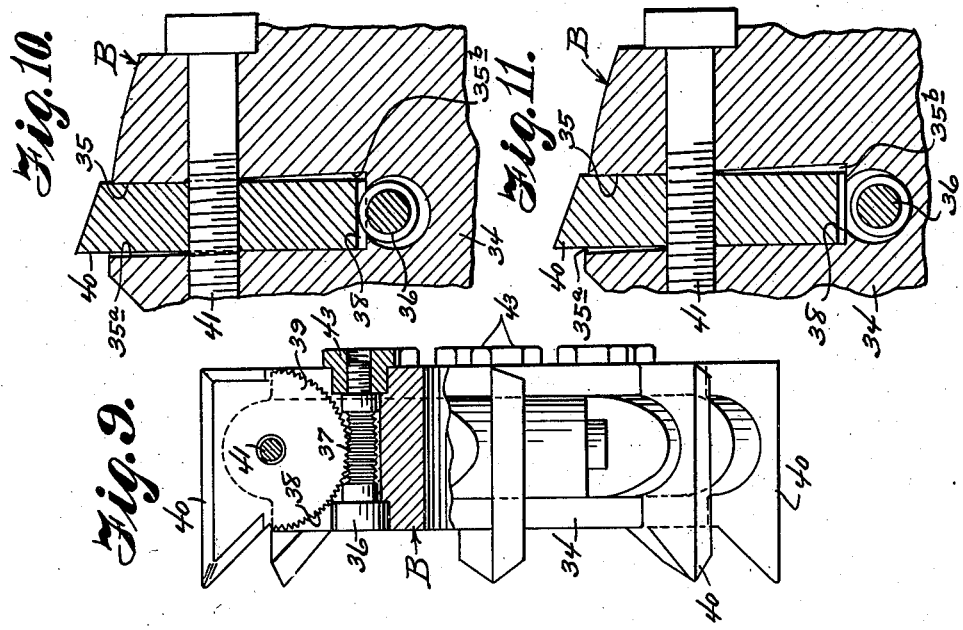
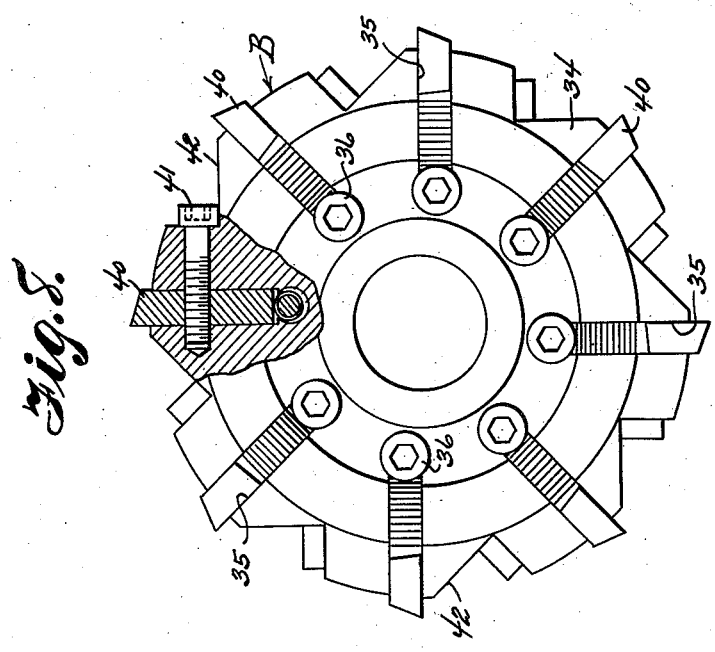
INVENTOR.
John E. Schlenkert
BY Victor J. Evans & Co.
ATTORNEYS Patented May 4, 1948

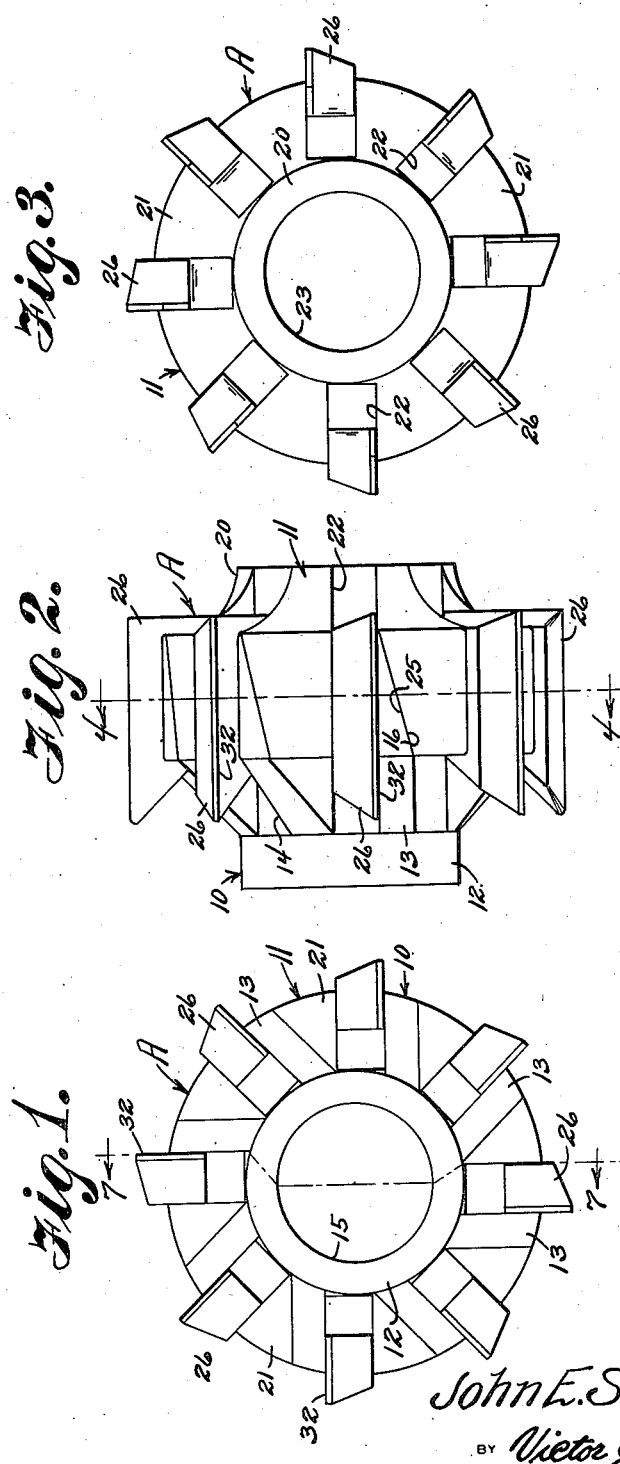

2,440,978

UNITED STATES PATENT OFFICE 2,440,978

ANGLE CUTTER

John E. Schlenkert, Detroit, Mich.

Application November 20, 1944, Serial No. 564,272

3 Claims. (Cl. 29—105)

1

The invention relates to an angle cutter, and more especially to an adjustable angle cutter.

The primary object of the invention is the provision of a cutter of this character, wherein a series of cutting blades are arranged in a head, which constitutes the hub of the cutter, and these blades can be selectively adjusted for varying the pitch of the same, the adjustment being novel and unique for effecting adjustment with ease and dispatch, as well as with accuracy.

Another object of the invention is the provision of a cutter of this character, wherein the blades are so mounted for adjustment, without resultant chatter and loss of adjustment, the said blades being locked in position, after adjustment thereof and in this manner will be maintained firm and secure.

A further object of the invention is the provision of a cutter of this character, wherein one set of blades will serve for different angular cuts, and these may be reversed, the cutter being usable on milling machines for cutting metal, aluminum, plastic material or wood, the reversible feature being for cutting operation, either right or left hand.

A still further object of the invention is the provision of a cutter of this character, which is simple in construction, thoroughly reliable and efficient in operation, strong, durable, readily and easily adjusted, self contained, accurate in the working thereof, compact, and inexpensive to manufacture and install.

With these and other objects in view, the invention consists in the features of construction, combination and arrangement of parts as will be hereinafter more fully described, illustrated in the accompanying drawings, which show the preferred and modified forms of construction thereof, and pointed out in the claims hereunto appended.

In the accompanying drawings:

Figure 1 is a facial elevation of the cutter constructed in accordance with the invention.

Figure 2 is a side view thereof.

Figure 3 is a view similar to Figure 1 looking toward the opposite face thereof.

Figure 4 is a sectional view taken on the line 4—4 of Figure 2 looking in the direction of the arrows.

Figure 5 is a side view of one section of the cutter.

Figure 6 is a side view of the other section thereof, with the blades removed.

Figure 7 is an exploded sectional view taken on the line 7—7 of Figure 1 looking in the direction of the arrows.

2

Figure 8 is an elevation, partly broken away, of a modified form of construction of the cutter.

Figure 9 is an edge view of the same, and partly broken away.

Figure 10 is a fragmentary sectional view thereof.

Figure 11 is a further fragmentary sectional view of the same.

Similar reference characters indicate corresponding parts throughout the several views in the drawings.

Referring to the drawings in detail, particularly Figures 1 to 7, inclusive, A designates generally the adjustable cutter in its entirety, constructed in accordance with the invention. The cutter A comprises a pair of companion body sections 10 and 11, respectively, the former having an arbor sleeve 12, provided with blades and slots 13 and 14, respectively, the blades or wings 13 being disposed on lines parallel to tangents through the center bore 15 in the arbor sleeve 12, and present an inclined or beveled outer surface 16, which extend at one side of each slot 14 to present a fifteen degree (15 degree) spiral cut as shown in Fig. 5. These blades project beyond one end of the arbor sleeve 12, which at this point presents a beveled coupling rim 18, for a companion coupling edge 19 of the section 11.

The section 11 is formed with a matching arbor sleeve or hub 20 to the sleeve 12, with a blunt end edge 21 opposite to the edge 19. The section 11 is concentric to the sleeve 20 is formed with bearing ribs or arms 21 spaced apart by slots 22 radially disposed to the bore 23 in the sleeve 20. One face of the slots 22 presents a beveled face as at 25, and within these slots 22 are fitted the cutter blades 26, which are formed with segmental wings 27, in the arcuate edge of each are cut serrations 28 for engagement by a tool set locking pin or screw 29, accessible through a clearance 30 in the said section 11, and in this manner the blades 26 can be locked at any desired or determined angle. The blades 26 each turn on a pivot 31 mounted in the section 11, and this pivot being tool set.

The sections 10 and 11 with the blades in place are interfitted with each other on a shaft not shown and held so interfitted in any desirable manner thereon. In other words, these sections are detachably inter-coupled with each other on the shaft.

The working edges of the blades 26 are formed with cutting surfaces 32, and each is provided with an outwardly tapered toe extension 33.

Referring now to Figures 8, 9, 10 and 11, a modified form of my invention includes a head B having a body part 34 formed with a plurality of radially spaced slots 35 opening through the outer perimeter thereof. The slots are of the same width as the thickness of blade to be received—see Figures 10 and 11, and the front upper, and the back lower, sides of the slot 35$^a$ and 35$^b$ respectively are relieved, that is to say a space will exist between the front and back of the blades under the influence of pressure, since when the blade is positioned in the slot under cutting pressure in making a cut, the blade will be forced against the sides that absorb cutting pressure, thus permitting quick release of the blades. The actuating bolts are off center with relation to the bottom of the slot 35 as shown, to permit this adjustment. In line with the above there is intersecting each slot 35 an adjusting bolt or screw 36 its threads meshing with serration 38 in the wing 39 of a turnable blade 40 which swings on the pivot 41, counterseated in a cut out 42 in the body 34, and accessible therethrough. The bolt or screw 36 has a lock nut 43 accessible at one side of the body, while the head of the screw or bolt is accessible for turning at the other side of the body. In operation by turning each bolt or screw 36, each blade 40 can be angularly adjusted with reference to body 34, and the blades are reversible if found desirable for reverse angular cutting operations by the cutter. This form of my invention has a single body section.

What is claimed is:

1. A reamer having a plurality of radially disposed cutting blades in slots in a cutter head, said blades having sharp outer cutting edges substantially parallel to the axis of the cutter head and toothed arcuate inner edges, transversely disposed bolts in the cutter head extending through the said slots pivotally mounting the blades intermediate of the length and width thereof in the slots, means adjusting the blades to set the angle of the cutting edges thereof in relation to the axis of the cutter head, and a hub carrying wedge shaped blades positioned with the blades in the said slots locking the cutting blades in adjusted positions.

2. In a cutter, the combination, which comprises, a cutter head having a plurality of radially disposed slots extending inwardly from the peripheral surface thereof, the surfaces forming one side of the slots being parallel to the longitudinal axis of the cutter head and the surfaces forming the other side of the slots positioned at an acute angle to the said longitudinal axis of the cutter head, blades with straight outer cutting edges and toothed arcuate inner edges positioned in the slots, transversely disposed bolts in the cutter head extending through the said slots pivotally mounting the blades in the cutter head, means pivotally adjusting the blades to set the outer cutting edges thereof in relation to the longitudinal axis of the cutter head, and a plurality of wedge shaped blades carried at the end of a hub also positioned in the slots of the cutter head locking the cutting blades in adjusted positions.

3. An angle cutter comprising a hub with radially disposed cutter blade carrying arms with blade positioning surfaces on one side of each of the arms parallel to the axis of the hub and with the surfaces on the other side of the arms slightly inclined in relation to a plane aligned with the axis of the hub, said arms having transverse bolt receiving openings therethrough with shoulders in the openings, cutter blades with straight cutting edges parallel to the axis of the hub having toothed arcuate inner edges and with threaded openings therein registering with the transverse openings of the arms, bolts in the openings threaded in the blades for holding the blades against the blade positioning surfaces of the arms, means engaging the toothed inner edges of the blades for locking the blades in adjusted positions, and removable tapering wings carried by a sleeve aligned with the hub positioned between the surfaces of the blades and inclined surfaces of the arms coacting with the locking means for clamping the blades in adjusted positions.

JOHN E. SCHLENKERT.

REFERENCES CITED

The following references are of record in the file of this patent:

UNITED STATES PATENTS

| Number | Name | Date |
|---|---|---|
| 108,305 | Van Haagen | Oct. 11, 1870 |
| 126,522 | Cooper | May 7, 1872 |
| 752,724 | Taylor | Feb. 23, 1904 |
| 1,160,625 | Long | Nov. 16, 1915 |
| 1,296,546 | Miller | Mar. 4, 1919 |
| 1,414,060 | Willson et al. | Apr. 25, 1922 |
| 1,468,774 | Caldwell | Sept. 25, 1923 |
| 1,572,752 | North | Feb. 9, 1926 |
| 1,963,767 | Vanderlip | June 19, 1934 |
| 2,057,842 | Nielsen | Oct. 20, 1936 |